United States Patent
Kojima et al.

(10) Patent No.: US 7,527,296 B2
(45) Date of Patent: May 5, 2009

(54) SEAT BELT BUCKLE ROTATION ANGLE RESTRICTION MECHANISM

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/954,884

(22) Filed: Dec. 12, 2007

(65) Prior Publication Data

US 2008/0143093 A1 Jun. 19, 2008

(30) Foreign Application Priority Data

Dec. 14, 2006 (JP) .............................. 2006-336684

(51) Int. Cl.
*B60R 22/26* (2006.01)
(52) U.S. Cl. ..................................... 280/801.1; 297/481
(58) Field of Classification Search ............. 280/801.1, 280/801.2, 803, 804, 805, 808; 297/468, 297/470, 471, 472, 481
See application file for complete search history.

(56) References Cited

U.S. PATENT DOCUMENTS

| | | | | |
|---|---|---|---|---|
| 2,640,246 A * | 6/1953 | Shomber | ...................... | 24/628 |
| 5,016,916 A * | 5/1991 | Yokote et al. | ............. | 280/801.2 |
| 5,064,220 A * | 11/1991 | Ogawa | ..................... | 280/801.1 |
| 5,125,611 A * | 6/1992 | Cox | ............................ | 248/429 |
| 5,215,332 A * | 6/1993 | De Sloovere | ............. | 280/801.1 |
| 5,236,220 A * | 8/1993 | Mills | ........................ | 280/801.1 |
| 5,855,047 A * | 1/1999 | Haas | .......................... | 24/684 |
| 6,581,969 B2 * | 6/2003 | Nishide | .................... | 280/801.1 |
| 6,830,406 B2 * | 12/2004 | Kim et al. | .................... | 403/120 |
| 7,229,135 B2 * | 6/2007 | Hyatt et al. | .................. | 297/481 |
| 7,364,200 B2 * | 4/2008 | Downey | .................. | 280/801.1 |
| 2002/0050707 A1 * | 5/2002 | Nishide | .................... | 280/801.1 |

FOREIGN PATENT DOCUMENTS

JP 2001-180435 7/2001

* cited by examiner

*Primary Examiner*—John Q. Nguyen
*Assistant Examiner*—Joseph Rocca
(74) *Attorney, Agent, or Firm*—Oblon, Spivak, McClelland, Maier & Neustadt, P.C.

(57) ABSTRACT

A seat belt buckle rotation angle restriction mechanism includes a shaft portion fixed to one of the seat support member and the buckle support member, a bearing portion provided at the other one of the seat support member and the buckle support member, the bearing portion accommodating the shaft portion in such a manner that the shaft portion is rotatable, at least two rotational side surfaces provided at one of outer contact surfaces of the shaft portion and inner contact surfaces of the bearing portion, the two rotational side surfaces being symmetric about a rotational center of the buckle support member, and at least two block side surfaces provided at the other one of the outer contact surfaces and the inner contact surfaces, the two block side surfaces being symmetric about the rotational center, each block side surface forming a predetermined angle with each rotational side surface.

7 Claims, 5 Drawing Sheets

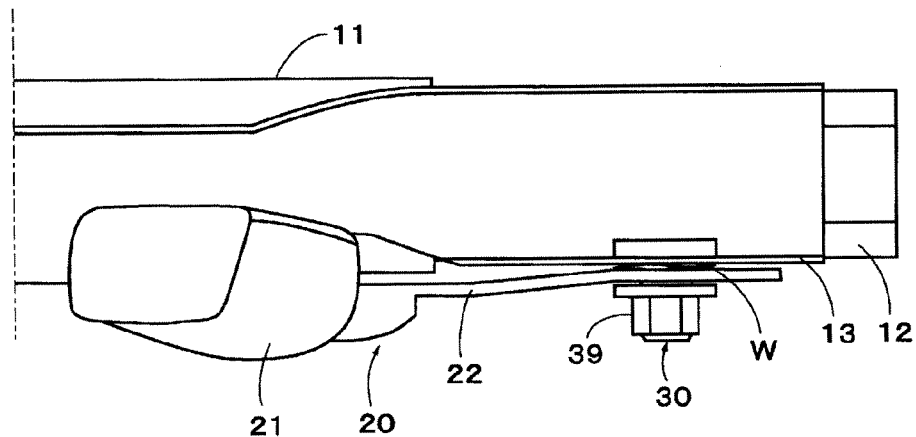
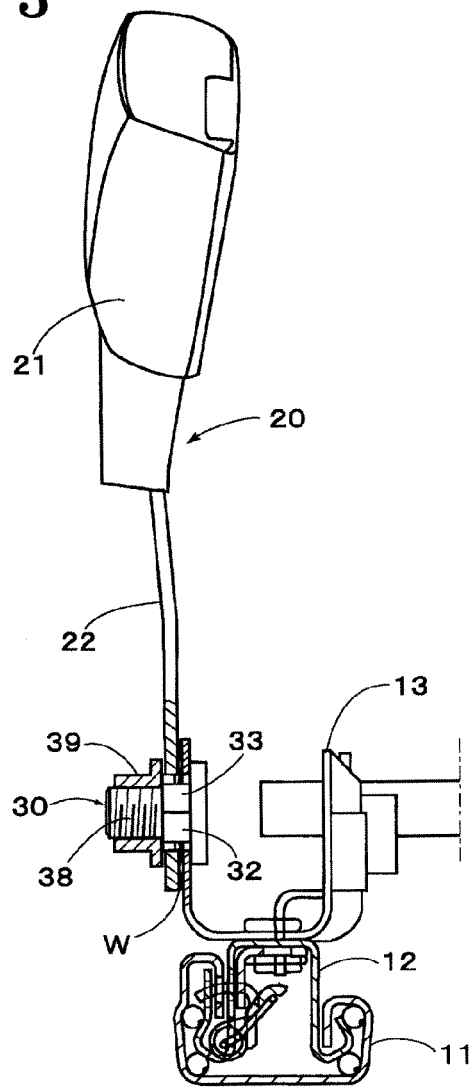

SEAT BELT BUCKLE ROTATION ANGLE RESTRICTION MECHANISM

CROSS REFERENCE TO RELATED APPLICATIONS

This application is based on and claims priority under 35 U.S.C. § 119 to Japanese Patent Application No. 2006-336684, filed on Dec. 14, 2006, the entire content of which is incorporated herein by reference.

FIELD OF THE INVENTION

This invention generally relates to a seat belt buckle rotation angle restriction mechanism.

BACKGROUND

A seat belt attached to a seat for a vehicle is mounted onto a vehicle body by means of a seat belt anchorage. The seat belt anchorage includes a member for supporting the seat to the vehicle body side (hereinafter referred to as "seat support member"). Then, a member for supporting a buckle of the seat belt (hereinafter referred to as "buckle support member") is provided at the seat support member in such a manner as to be rotatable within a predetermined rotation angle. The buckle support member together with the buckle is called an inner belt. For example, JP2001-180435A discloses an inner belt rotation restriction mechanism.

JP2001-180435A also discloses an inner belt for a passenger seat of a vehicle as a conventional art. The inner belt disclosed includes a stay of which one end is rotatably fixed to a side portion of the seat, and a buckle provided at an end of the stay so as to be engageable with a tongue plate of a seat belt. In order to restrict a rotation of the inner belt in a forward direction of the vehicle, a stopper constituted by being cut and raised is formed at a slide rail attached to the seat in the rear of a rotational axis of the stay so that the stay of the inner belt can make contact with the stopper. As stated above, the cut and raised portion is generally formed in the front or rear of the stay so as to be engageable therewith for achieving an inner belt rotation restriction mechanism. Meanwhile, the inner belt rotation restriction mechanism disclosed in JP2001-180435A is constituted by an inner belt including a rotational axis at one end rotatably mounted onto a side frame forming a side portion of a seat cushion for a vehicle and a connecting portion at the other end connected to the seat belt, and a stopper bracket fixed to the side frame in the front of the rotational axis of the inner belt and including a stopper portion outwardly projecting from the side portion of the seat cushion. According to the inner belt rotation restriction mechanism disclosed, an operation of the inner belt is only restricted when the inner belt tilts towards the seat and rotates in the forward direction and otherwise is not restricted.

According to the aforementioned rotation restriction mechanism in which the cut and raised portion is formed in the front or rear of the stay, the cut and raised portion or a stopper portion is required to be formed away from a rotational center of the stay. Thus, an arrangement of peripheral components, and the like is restricted or a structure of a peripheral portion is complicated, which may lead to a cost increase or increase in size of the rotation restriction mechanism.

Thus, a need exists for a seat belt buckle rotation angle restriction mechanism which is not susceptible to the drawback mentioned above.

SUMMARY OF THE INVENTION

According to an aspect of the present invention, a seat belt buckle rotation angle restriction mechanism for restricting a buckle support member for a seat belt to rotate within a predetermined angle range, the buckle support member being rotatably supported by a seat support member for a vehicle, includes a shaft portion fixed to one of the seat support member and the buckle support member, a bearing portion provided at the other one of the seat support member and the buckle support member, the bearing portion accommodating the shaft portion in such a manner that the shaft portion is rotatable, at least two rotational side surfaces provided at one of outer contact surfaces of the shaft portion and inner contact surfaces of the bearing portion, the two rotational side surfaces being symmetric about a rotational center of the buckle support member, and at least two block side surfaces provided at the other one of the outer contact surfaces of the shaft portion and the inner contact surfaces of the bearing portion, the two block side surfaces being symmetric about the rotational center of the buckle support member, each block side surface forming a predetermined angle with each rotational side surface.

BRIEF DESCRIPTION OF THE DRAWINGS

The foregoing and additional features and characteristics of the present invention will become more apparent from the following detailed description considered with reference to the accompanying drawings, wherein:

FIG. 2 is a plan view illustrating the seat belt buckle rotation angle restriction mechanism according to the embodiment of the present invention;

FIG. 3 is a partial cross-sectional view illustrating the seat belt buckle rotation angle restriction mechanism according to the embodiment of the present invention;

DETAILED DESCRIPTION

Figure 1:
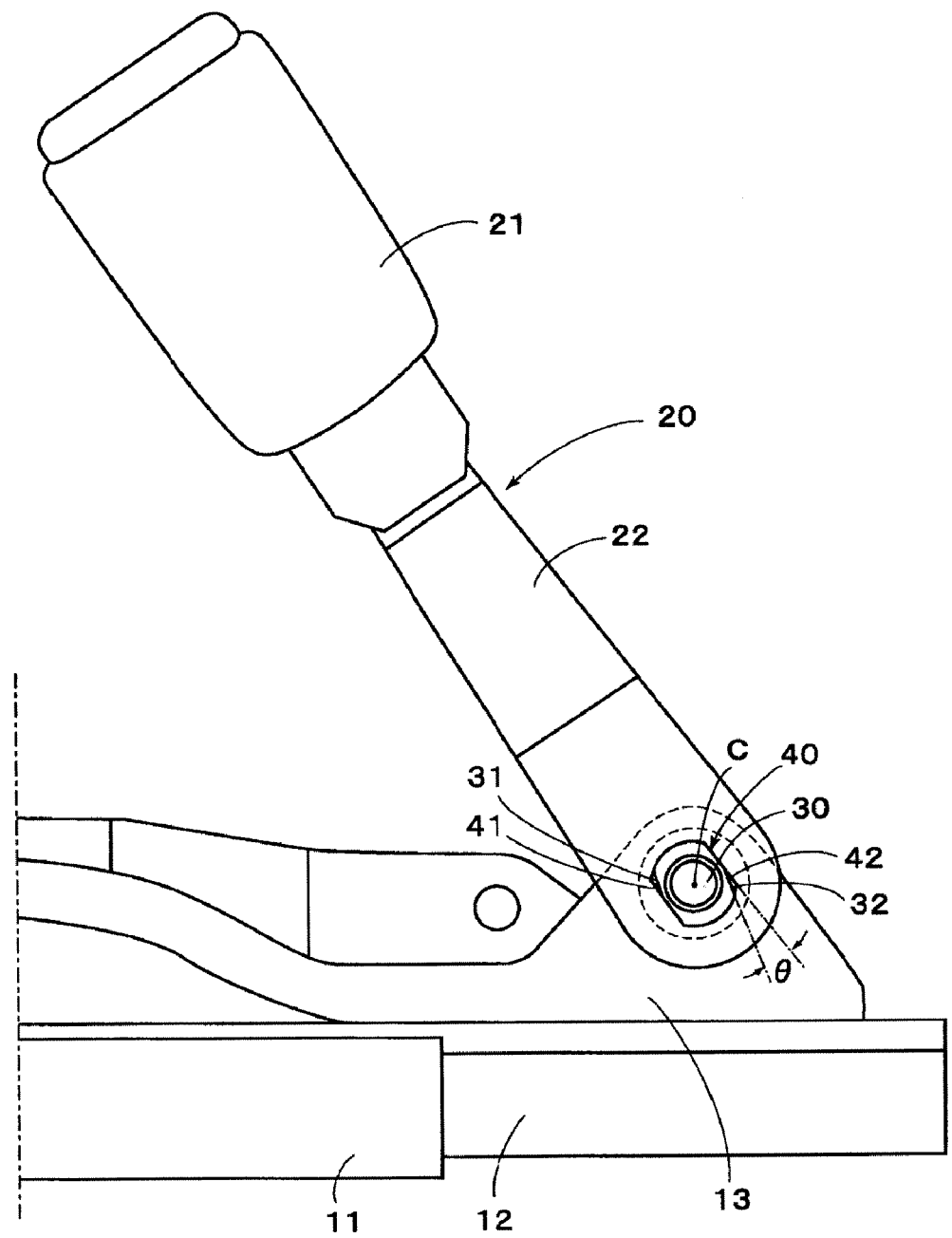
FIG. 1 is a front view illustrating a seat belt buckle rotation angle restriction mechanism according to an embodiment of the present invention.

An embodiment of the present invention will be explained with reference to the attached drawings. FIG. 1 is a front view illustrating a portion of a seat belt buckle rotation angle restriction mechanism according to the present embodiment. A seat for a vehicle (not shown) is supported by a seat slide apparatus. Specifically, the seat slide apparatus of the present embodiment includes a pair of lower rails 11 and a pair of upper rails 12 supported by the lower rails 11 so as to be slidable thereon. The lower rails 11 are fixed on a floor (not shown) so as to extend in a front-rear direction of the vehicle. The seat is supported by the upper rails 12 that serve as a seat support member according to the present embodiment. One of the pair of lower rails 11 and one of the pair of upper rails 12 are provided at each of right and left sides of a vehicle. However, in FIG. 1, only one side of the vehicle is illustrated.

As illustrated in FIG. 1, a bracket 13 also serving as a seat support member is fixed to the upper rail 12 so as to upwardly extend therefrom and to be positioned at an outer side of a seat (not shown) in a width direction A buckle support member for a seat belt (hereinafter simply referred to as "buckle support member") 20 including a buckle 21 and a stay 22 is rotatably supported by the bracket 13. Then, a stepped bolt 30 illustrated in FIG. 4 and serving as a shaft portion is fixed to the bracket 13. The stepped bolt 30 includes first and second outer contact surfaces 31 and 32, and third and fourth outer contact surfaces 33 and 34, each serving as a rotational side surface (i.e., at least two rotational side surfaces according to the present embodiment). The first and second outer contact surfaces 31 and 32 are arranged so as to be symmetrical about a rotational center C of the buckle support member 20. In the same way, the third and fourth outer contact surfaces 33 and 34 are arranged so as to be symmetrical about the rotational center C of the buckle support member 20.

Figure 4:
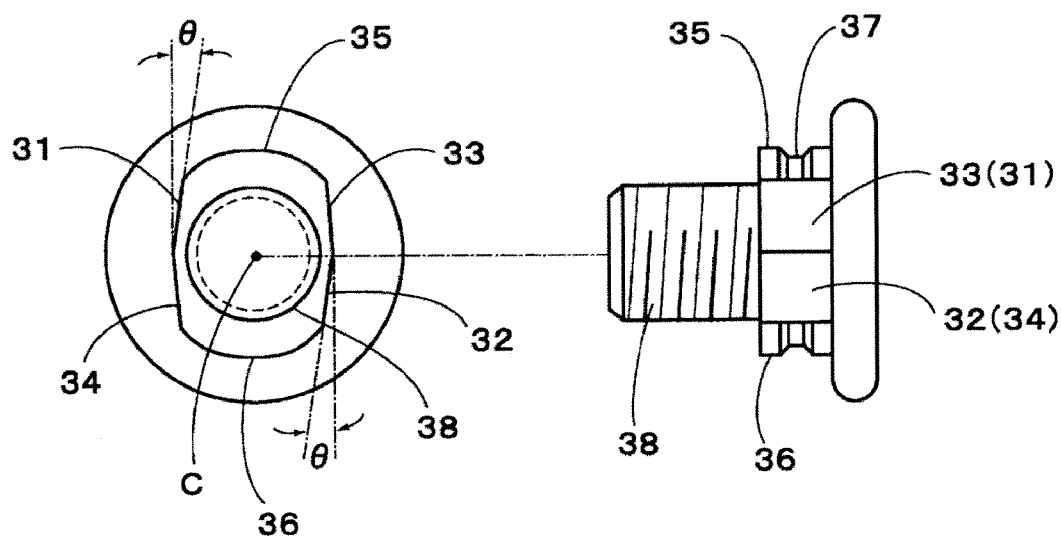
FIG. 4 is front view and a side view illustrating a stepped bolt serving as a shaft portion according to the embodiment of the present invention.

As illustrated in FIG. 4, the first outer contact surface 31 and the third outer contact surface 33 form a predetermined angle (i.e., 2·θ) therebetween while the second outer contact surface 32 and the fourth outer contact surface 34 also form the predetermined angle (i.e., 2·θ) therebetween. In addition, the first and second outer contact surfaces 31 and 32 are arranged in parallel with each other while the third and fourth contact surfaces 33 and 34 are also arranged in parallel with each other. A side surface 35 connecting the first and third outer contact surfaces 31 and 33, and a side surface 36 connecting the second and fourth outer contact surfaces 32 and 34 are formed in such a way as to match a portion of an outer peripheral surface of a cylindrical column having an axial center equal to the rotational center C. Further, as illustrated in FIG. 4, a groove 37 for holding a wave washer W (see FIG. 2) is formed at each outer periphery of the side surfaces 35 and 36. A screw portion 38 is formed at an end portion of the stepped bolt 30.

Figure 5:
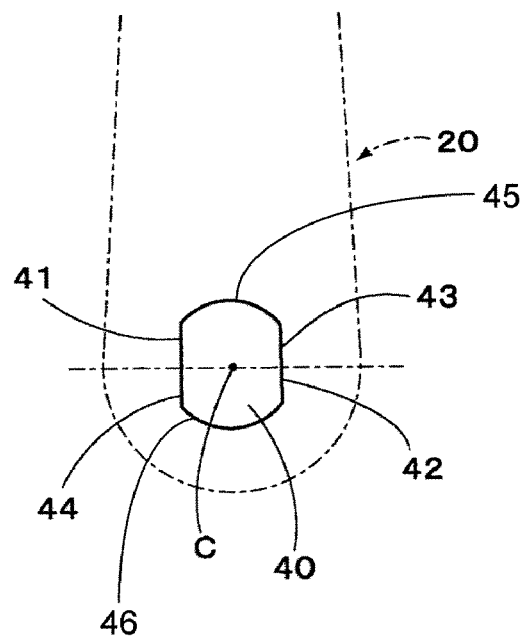
FIG. 5 is a front view illustrating a bore serving as a bearing portion according to the embodiment of the present invention.

The buckle support member 20 includes a bore 40 serving as a bearing portion. As illustrated in FIG. 5, the bore 40 forms into a racetrack shape having two linear portions and two curved portions. Thickness surface sides of the two linear portions constitute first and second inner contact surfaces 41 and 42, and third and fourth inner contact surfaces 43 and 44, each serving as a block side surface (i.e., at least two block side surfaces according to the present embodiment). The first and second inner contact surfaces 41 and 42 are arranged so as to be symmetrical about the rotational center C of the buckle support member 20. In the same way, the third and fourth inner contact surfaces 43 and 44 are arranged so as to be symmetrical about the rotational center C of the buckle support member 20. Then, thickness surface sides of the two curved portions constitute a side surface 45 connecting the first and third inner contact surfaces 41 and 43, and a side surface 46 connecting the second and fourth inner contact surfaces 42 and 44. The side surfaces 35 and 36 of the stepped bolt 30 are slidable onto the side surfaces 45 and 46 of the bore 40, respectively. In the following, the first and second outer contact surfaces 31 and 32, and the first and second inner contact surfaces 41 and 42 will be mainly explained.

The stepped bolt 30 having the aforementioned structure is attached to the bracket 13 in such a way that a shaft portion of the stepped bolt 30 outwardly extends from the seat as illustrated in FIGS. 2 and 3. Then, the buckle support member 20 is attached to the bracket 13 via the wave washer W. That is, when the shaft portion of the stepped bolt 30 is inserted into the bore 40, the side surface 35 connecting the first and third outer contact surfaces 31 and 33, and the side surface 36 connecting the second and fourth outer contact surfaces 32 and 34, are made slidable onto the side surfaces 45 and 46 of the bore 40. When a nut 39 is threaded onto the screw portion 38 of the stepped bolt 30, the stepped bolt 30 is supported so as to be closely in contact with the bracket 13 and the buckle support member 20 as illustrated in FIGS. 2 and 3. Accordingly, the first and second outer contact surfaces 31 and 32 of the stepped bolt 30 are rotatable with the first and second inner contact surfaces 41 and 42, respectively, by a predetermined angle θ at a maximum. In FIG. 1, the nut 39 is omitted for convenience of explanation.

Figure 6:
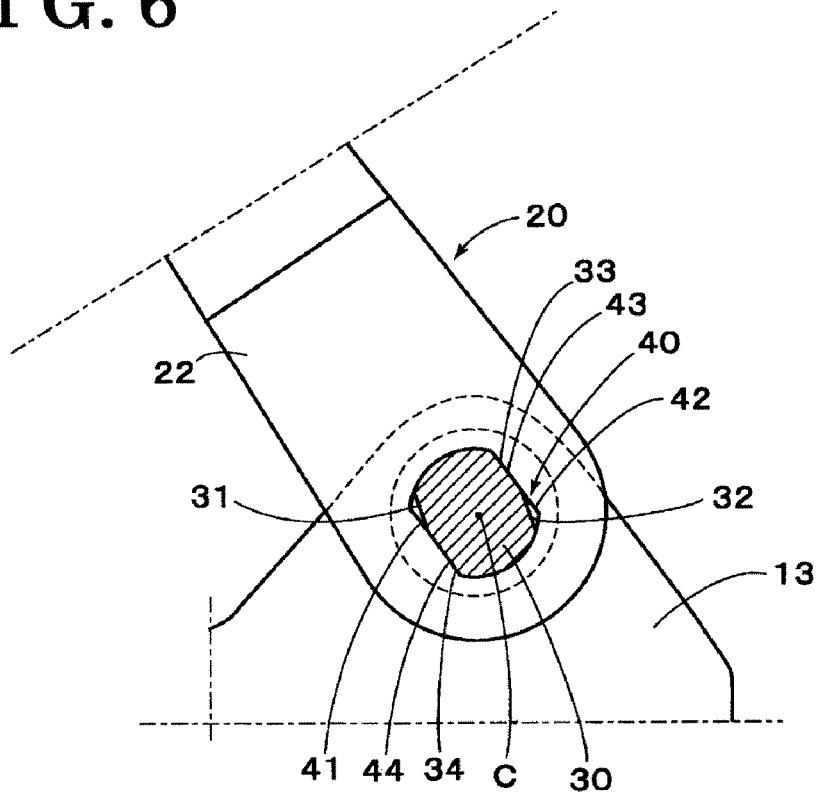
FIG. 6 is a front view illustrating an operating state of the seat belt buckle rotation angle restriction mechanism according to the embodiment of the present invention.
Figure 7:
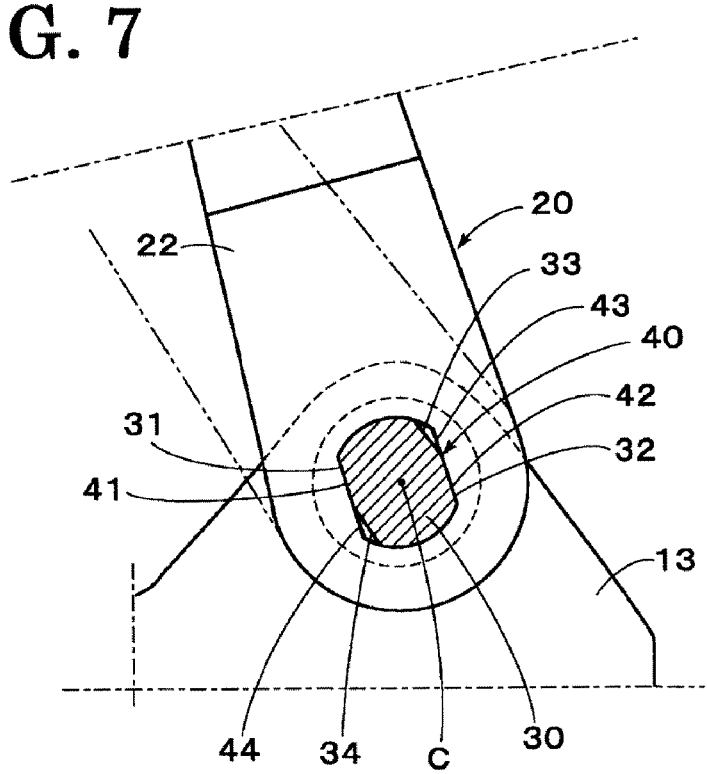
FIG. 7 is a front view illustrating the operating state of the seat belt buckle rotation angle restriction mechanism according to the embodiment of the present invention.

According to the aforementioned seat belt buckle rotation angle restriction mechanism of the present embodiment, the buckle support member 20 is rotatable relative to the bracket 13 within a range of the predetermined angle θ. For example, as illustrated in FIG. 6, in the cases where the buckle support member 20 is shifted forward of the vehicle and then the third and fourth inner contact surfaces 43 and 44 (i.e., rotational side surfaces) of the bore 40 make contact with the third and fourth outer contact surfaces 33 and 34 of the stepped bolt 30, the rotation of the buckle support member 20 is impeded. Thus, the third and fourth outer contact surfaces 33 and 34 of the stepped bolt 30 serve as the block side surfaces. On the other hand, as illustrated in FIG. 7, in the cases where the buckle support member 20 is shifted rearward of the vehicle and then the first and second inner contact surfaces 41 and 42 (i.e., rotational side surfaces) of the bore 40 make contact with the first and second outer contact surfaces 31 and 32 of the stepped bolt 30, the rotation of the buckle support member 20 is impeded. Thus, the first and second outer contact surfaces 31 and 32 serve as the block side surfaces.

Figure 8:
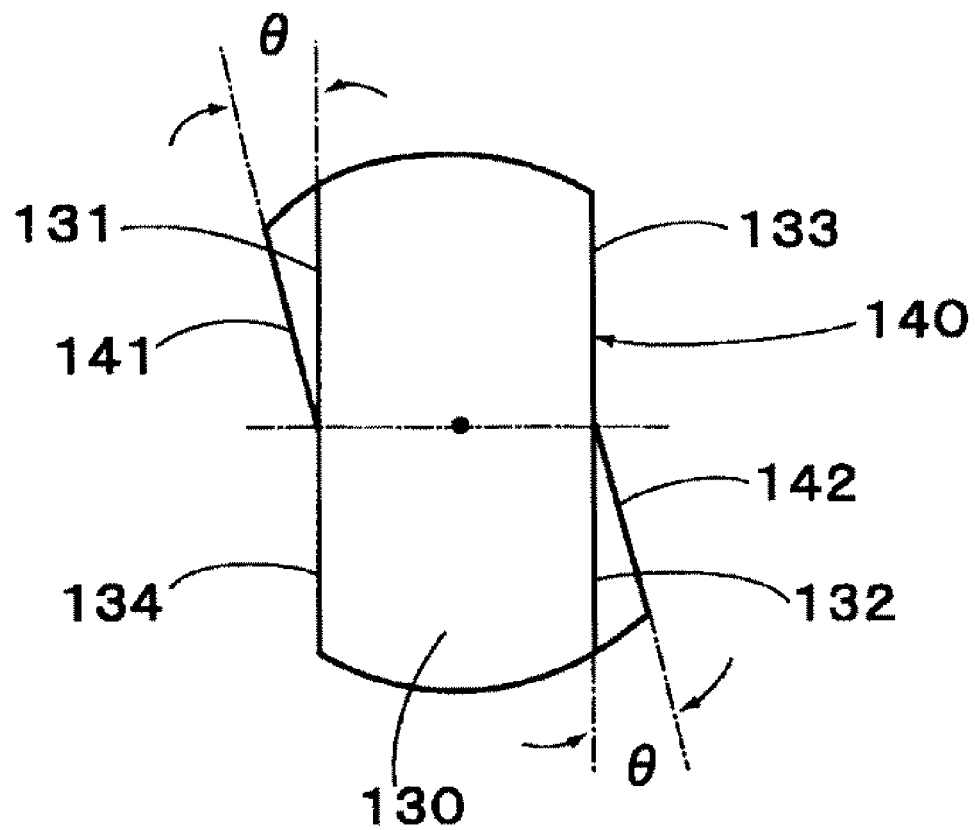
FIG. 8 is a front view illustrating a shaft portion and a bearing portion according to another embodiment of the present invention.

According to the aforementioned seat belt buckle rotation angle restriction mechanism, the cross section of the bore 40 serving as the bearing portion forms into the racetrack shape. Alternatively, the cross section of the stepped bolt 30 serving as the shaft portion may form into the racetrack shape. In this case, the cross section of the bore 40 may form into a shape illustrated in FIG. 8. In FIG. 8, the components illustrated in FIGS. 4 and 5 are explained by numbers each added by 100.

Further, according to the aforementioned seat belt buckle rotation angle restriction mechanism, the bore 40 is formed at the buckle support member 20 and the stepped bolt 30 is fixed to the bracket 13. Alternatively, the stepped bolt 30 may be fixed to the buckle support member 20 and the bore 40 may be formed at the bracket 13. In this case, the outer contact surfaces of the stepped bolt 30 serve as the rotational side surfaces while the inner contact surfaces of the bore 40 serve as the block side surfaces.

Accordingly, the seat belt buckle rotation angle restriction mechanism can be basically constituted by the stepped bolt 30 and the bore 40 to thereby achieve an appropriate structure of the restriction mechanism in response to a relationship between the stepped bolt 30 and the bore 40 without being affected by peripheral components, and the like. As a result, the bracket 13 and the buckle support member 20 can be simply configured to thereby achieve a compact structure of the restriction mechanism with a low cost as a whole.

According to the aforementioned embodiment, the bore 40 including at least two of the inner contact surfaces 41, 42, 43, and 44 is formed at the buckle support member 20, and the stepped bolt 30 including at least two of the outer contact surfaces 31, 32, 33, and 34 is fixed to the bracket 13.

Further, according to the aforementioned embodiment, the seat support member includes an upper rail 12 being slidable onto a lower rail 11 fixed to the vehicle and a bracket 13 fixed to the upper rail 12, and the stepped bolt 30 is fixed to the bracket 13.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which full within the spirit and scope of the present invention as defined in the claims, be embraced thereby.

The invention claimed is:

1. A seat belt buckle rotation angle restriction mechanism for restricting a buckle support member for a seat belt to rotate within a predetermined angle range, the buckle support member being rotatably supported by a seat support member for a vehicle, comprising:
    a shaft portion fixed to one of the seat support member and the buckle support member;
    a bearing portion provided at the other one of the seat support member and the buckle support member, the bearing portion supporting the shaft portion in such a manner that the shaft portion is rotatable;
    at least two rotational side surfaces provided at one of outer contact surfaces of the shaft portion and inner contact surfaces of the bearing portion, the two rotational side surfaces being symmetric about a rotational center of the buckle support member; and
    at least two block side surfaces provided at the other one of the outer contact surfaces of the shaft portion and the inner contact surfaces of the bearing portion, the two block side surfaces being symmetric about the rotational center of the buckle support member, each block side surface forming a predetermined angle with each rotational side surface,
    wherein the at least two rotational side surfaces and the at least two block side surfaces restrict the rotation of the buckle support member relative to the seat support member by engagement between at least one of the rotational side surfaces and at least one of the block side surfaces.

2. A seat belt buckle rotation angle restriction mechanism according to claim 1, wherein the bearing portion is formed at the buckle support member, and the shaft portion is fixed to the seat support member.

3. A seat belt buckle rotation angle restriction mechanism according to claim 2, wherein the seat support member includes an upper rail being slidable onto a lower rail fixed to the vehicle and a bracket fixed to the upper rail, and the shaft portion is fixed to the bracket.

4. A seat belt buckle rotation angle restriction mechanism according to claim 1, wherein each of the rotational side surfaces includes a flat surface and each of the block side surfaces includes a flat surface engaged with the flat surface of the each of the rotational side surfaces.

5. A seat belt buckle rotation angle restriction mechanism according to claim 4, wherein the flat surfaces of the block side surfaces are arranged in parallel with each other.

6. A seat belt buckle rotation angle restriction mechanism according to claim 4, wherein each flat surface of the block side surfaces forms a predetermined angle with each flat surface of the rotational side surfaces.

7. A seat belt buckle rotation angle restriction mechanism according to claim 1, wherein the bearing portion includes a bore rotatably supporting the shaft portion, first and second flat surfaces as the rotational side surfaces are provided at the bore and third and fourth flat surfaces as the block side surfaces are provided at the shaft portion to engage with the first and second flat surfaces, respectively.

* * * * *